United States Patent
Lakshmi Narayanan (10) Patent No.: US 10,051,439 B2
(45) Date of Patent: Aug. 14, 2018

(54) NETWORK ASSISTED AUTOMATIC CLUSTERING TO ENABLE VICTIM TO VICTIM COMMUNICATION

(71) Applicant: NOKIA SOLUTIONS AND NETWORKS OY, Espoo (FI)

(72) Inventor: Ram Lakshmi Narayanan, Pleasanton, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 34 days.

(21) Appl. No.: 14/911,791

(22) PCT Filed: Aug. 13, 2013

(86) PCT No.: PCT/EP2013/066852
§ 371 (c)(1),
(2) Date: Feb. 12, 2016

(87) PCT Pub. No.: WO2015/022012
PCT Pub. Date: Feb. 19, 2015

(65) Prior Publication Data
US 2016/0198316 A1 Jul. 7, 2016

(51) Int. Cl.
*H04W 4/08* (2009.01)
*H04W 4/02* (2018.01)
(Continued)

(52) U.S. Cl.
CPC ........... *H04W 4/08* (2013.01); *H04L 41/0668* (2013.01); *H04L 41/0816* (2013.01);
(Continued)

(58) Field of Classification Search
CPC ....... H04W 4/005; H04W 4/02; H04W 4/021; H04W 4/08; H04W 64/00; H04W 76/007;
(Continued)

(56) References Cited

U.S. PATENT DOCUMENTS 8,825,040 B2 * 9/2014 Hooli .................... H04W 72/02
455/11.1
9,473,916 B2 * 10/2016 Van Phan ............... H04W 4/22
(Continued)

FOREIGN PATENT DOCUMENTS

EP 2800442 A1 * 5/2014 ............. H04W 4/22

OTHER PUBLICATIONS

International Search Report and Written Opinion dated Apr. 2, 2014 corresponding to International Patent Application No. PCT/EP2013/066852.
(Continued)

*Primary Examiner* — Ahmed Elallam
(74) *Attorney, Agent, or Firm* — Squire Patton Boggs (US) LLP (57) ABSTRACT

Various communication systems may benefit from network assisted automatic clustering. For example, wireless communication systems may benefit from such clustering that enables victim to victim communication after the network becomes unavailable, for example due to a disaster. A method can include forming, by an element of a network, a cluster group for a plurality of user equipment in a location. The method can also include communicating, by the element, information comprising a cluster group identifier to a user equipment of the plurality of the user equipment. The cluster group can be configured to operate only when the network fails to operate.

20 Claims, 6 Drawing Sheets

(51) Int. Cl.
*H04W 84/18* (2009.01)
*H04L 29/14* (2006.01)
*H04W 8/18* (2009.01)
*H04L 12/24* (2006.01)
*H04W 4/021* (2018.01)
*H04W 76/50* (2018.01)
*H04W 76/14* (2018.01)
*H04W 76/15* (2018.01)
*H04W 64/00* (2009.01)
*H04W 88/04* (2009.01)
*H04W 4/70* (2018.01)

(52) U.S. Cl.
CPC .......... *H04L 41/0893* (2013.01); *H04L 69/40* (2013.01); *H04W 4/021* (2013.01); *H04W 8/186* (2013.01); *H04W 76/14* (2018.02); *H04W 76/15* (2018.02); *H04W 76/50* (2018.02); *H04W 4/02* (2013.01); *H04W 4/70* (2018.02); *H04W 64/00* (2013.01); *H04W 84/18* (2013.01); *H04W 88/04* (2013.01)

(58) Field of Classification Search
CPC . H04W 76/023; H04W 76/025; H04W 84/18; H04W 88/04; H04W 8/186; H04L 41/0668; H04L 41/0654; H04L 41/0686; H04L 41/0816; H04L 41/0893; H04L 69/40
See application file for complete search history.

(56) References Cited

U.S. PATENT DOCUMENTS

| 9,565,573 | B2* | 2/2017 | Mukherjee | H04W 16/26 |
| 9,756,665 | B2* | 9/2017 | Narayanan | H04W 48/16 |
| 2004/0018839 | A1* | 1/2004 | Andric | H04L 12/2856 |
| | | | | 455/433 |
| 2015/0029866 | A1* | 1/2015 | Liao | H04W 4/008 |
| | | | | 370/241 |
| 2015/0043398 | A1* | 2/2015 | Fwu | H04W 64/006 |
| | | | | 370/280 |
| 2016/0192420 | A1* | 6/2016 | Kim | H04W 74/00 |
| | | | | 370/329 |
| 2016/0309284 | A1* | 10/2016 | Lee | H04W 4/08 |
| 2016/0374068 | A1* | 12/2016 | Kim | H04W 72/04 |

OTHER PUBLICATIONS

3GPP TR 23.703 V0.5.0 (Jul. 2013), Technical Report, 3rd Generation Partnership Project; Technical Specification Group Services and System Aspects; Study on architecture enhancements to support Proximity Services (ProSe) (Release 12), Jul. 27, 2013, XP050725380, 176 pages.

Gabor Fodor et al., "Design Aspects of Network Assisted Device-to-Device Communications," IEEE Communications Magazine, IEEE Service Center, vol. 50, No. 3, Mar. 1, 2012, pp. 170-177, XP011429640.

General Dynamics Broadband UK, "Discussion on Out-of-coverage D2D communication for public safety," 3GPP Draft; R2-132433, 3GPP TSG-RAN2#83, Barcelona, Spain, Aug. 19-23, 2013, Aug. 9, 2013, XP050718176, 4 pages.

Ericsson et al., "Considerations on D2D work in RAN2 and potential way forward," 3GPP Draft; R2-132690, 3GPP TSG-RAN WG2#83, Barcelona, Spain, Aug. 19-23, 2013, Aug. 10, 2013, XP050718468, 4 pages.

* cited by examiner

46 clusters, 45~55 links per cluster

Figure 4B 32 clusters, 5~7 links per cluster

Figure 4C 94 clusters, 2~4 links per cluster

NETWORK ASSISTED AUTOMATIC CLUSTERING TO ENABLE VICTIM TO VICTIM COMMUNICATION

BACKGROUND

Field

Various communication systems may benefit from network assisted automatic clustering. For example, wireless communication systems may benefit from such clustering that enables victim to victim communication after the network becomes unavailable, for example due to a disaster.

Description of the Related Art

Cellular network and Wi-Fi network coverage is pervasive, particularly in urban areas. Depending upon available capacity at a given location over a time, the network can deliver requested service to users. In addition, in connection with the third generation partnership project (3GPP), for example, device-to-device (D2D) and Proximity Service (ProSe) are being created.

A goal of D2D is to enable direct communication between the devices. This direct communication can increase capacity of wireless base station. D2D, therefore, allows combining infrastructure-mode and ad hoc communication. Much study of ProSe and D2D is related to network assisted services. There are, however, scenarios in which coordinated D2D ad hoc communication may be needed. One such situation is a disaster scenario. For example, when a disaster happens a network can get disturbed and existing schemes do not allow victims, namely users who are trapped inside the disaster region, to communicate to another victim in coordinated fashion. Such coordinated communication between victims can be referred to as victim-to-victim (V2V) communication.

Disasters are exceptional events that can be either man made, such as terrorist attacks, or natural, such as earthquakes, wildfires and floods. Disasters can create emergency situations and cause physical and social disorder. In these emergency situations, food, water, shelter, protection and medical help may be needed, and the effort needed to provide these basic services to the victims may need to be coordinated quickly.

In disasters, typically most of the casualties occur within 48 hours of disaster incident. Moreover, cellular network (towers) and communication and power lines that were present before disaster are often not operational. Victims, including users affected in the disaster area, conventionally cannot get in touch with their families.

Thus, victims in the disaster region typically help each other until proper communication and rescue operations are in place. Moreover, disaster relief operations can take place with the help of medical departments, fire departments, and police departments, but these public safety organizations typically establish communication very late. Immediately after a disaster, victims typically try to help each other, as first hand help. Moreover, victims typically attempt to comfort themselves by searching for their friends and families in a nearby disaster region. Movement of victims may typically be restricted to less than two kilometers.

Conventionally, when people in a disaster situation look for cellular coverage or any other established services, they are not available. Moreover, victims may want to help each other and may move in groups. Nevertheless, conventionally radio systems are unable to extend D2D to V2V services in the event of total network collapse or failures.

Rather, existing D2D schemes focus mostly on user communication by means of direct D2D, and public safety when the network is not available. In a public safety case, a first public safety user equipment (PUE1) can directly communicate with another public safety user equipment (PUE2) or with the public safety control center. The goal of this approach is to have network assisted D2D communication or with proximity based user equipment (UE) to UE communication via application support. Conventionally, victim to victim communication is missing, even though victims may need to help themselves immediately after disaster.

Figure 1A:
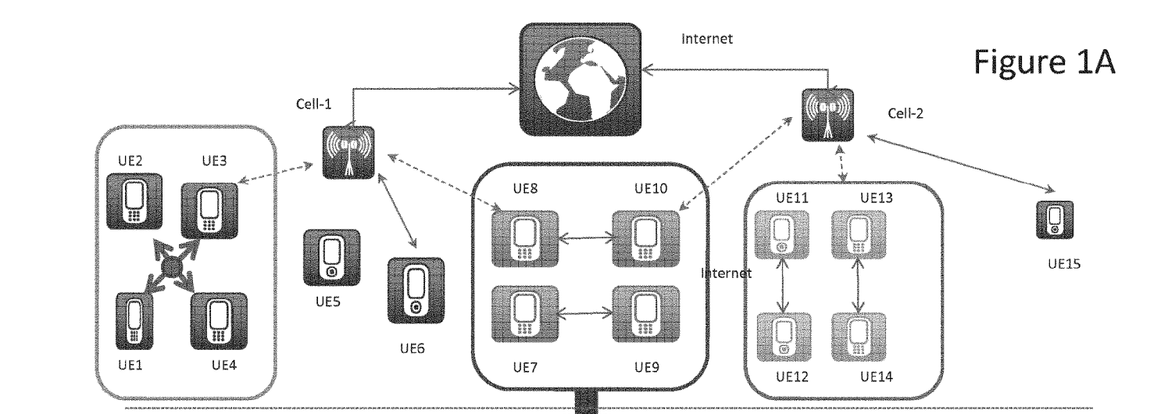
FIG. 1A illustrates a communication system prior to a disaster event.

FIG. 1A illustrates a communication system prior to a disaster event. Thus, FIG. 1A shows a snapshot of a network and communication between endpoints. Various UE distributed in a given area can be communicating either directly or through the internet. All possible combinations can be examined by considering roaming, WLAN/Cellular/D2D and network assisted communication.

As shown in FIG. 1A, UE1-4 are in close proximity and are engaged in group communication amongst themselves, while being served by Cell1. UE-5 is idle and may be in close proximity with either UE1-4 or UE-6. UE-6 is engaged in internet browser activity and has a connection, as a communicating path, established to internet via cell-1.

As shown in FIG. 1A, UE7-10 are engaged in device to device communication. UE7 and UE8 can also be served by cell1 and UE9 and UE10 can also be served by cell2, although UE8 can be in D2D communication with UE10 and UE7 can in D2D communication with UE9. Moreover, cell1 and cell2 may be run by different operators.

UE11 is, in FIG. 1A, having D2D with UE12; it is possible that UE11 is in HomePLMN and UE12 is roaming. UE13 and UE14 are engaged in D2D conversation and may be using WLAN direct communication. UE15, as shown, does not having any proximity service enabled as part of UE15's profile, but may be near UE13 or UE14. Another possible scenario is that UE14 may be communicating to UE6 over the internet.

Figure 1B:
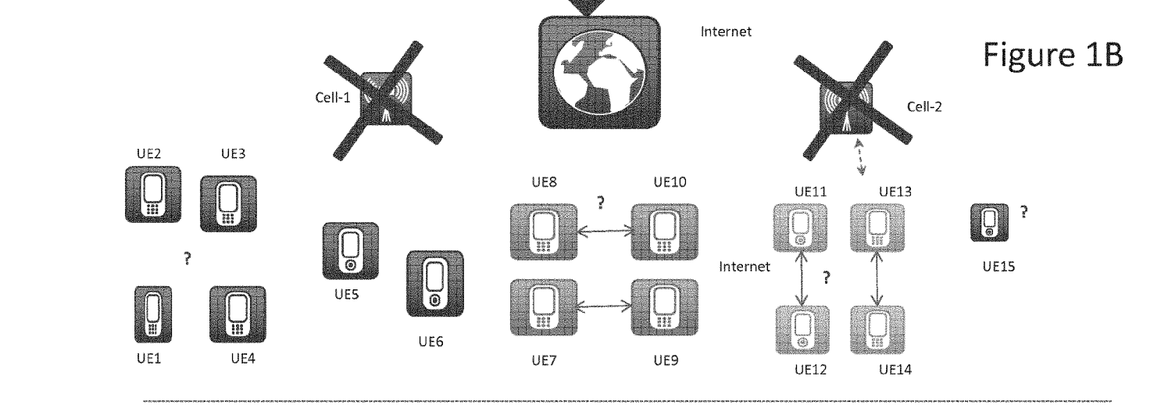
FIG. 1B illustrates a communication system subsequent to or during a disaster event.

FIG. 1B illustrates a communication system subsequent to or during a disaster event. Thus, FIG. 1B shows a snapshot of the network after the beginning of a disaster. As shown in FIG. 1B, communicating cell towers cell1 and cell2 are not available any more, thus the communicating UEs that use network assisted D2D may not work. If there are UEs that are communicating directly using Wi-Fi direct only, such UEs may communicate. The nature of the user may change, however. For example, the user may not try to communicate Wi-Fi direct to share an application. Instead the user may try to reach out to emergency services. When emergency services are not available, the user may try to establish communication with other victims to form a V2V network.

Some challenges may exist. For example, proximity services that were available using network assisted D2D are not valid any more, because the cell towers are not available. Moreover, conventionally V2V support is totally omitted when considering the disaster. For example, the system may be unable to retain the same cluster and to inform the UEs to use the same to establish V2V.

Furthermore, conventionally devices that are in proximity (for example UE1-4 may share profiles earlier among themselves but not with UE5) cannot help victim UE5 to be part of the group for V2V communication. Similarly, there is no conventional way for devices that are idle to wake up for V2V and to be part of some group.

If there is no guidance from the network, then conventionally each device may try to do ad hoc discovery and may quickly drain the battery. Such network formation may take a long time, and convergence of the network may not scale. Existing ad hoc protocols are not efficient for such purposes. For example, existing ad hoc protocols do not scale well, do not know the number of nearby nodes prior to the disaster, and do exhaustive scanning, which can drain the battery quickly.

SUMMARY

According to certain embodiments, a method can include forming, by an element of a network, a cluster group for a plurality of user equipment in a location. The method can also include communicating, by the element, information comprising a cluster group identifier to a user equipment of the plurality of the user equipment. The cluster group can be configured to operate only when the network fails to operate.

In certain embodiments, a method can include storing, at a user equipment, information comprising a cluster group identifier received from an element of a network, wherein the cluster group identifier is configured to group a plurality of user equipment including the user equipment. The method can also include determining, at the user equipment, that the network fails to operate. The method can further include communicating, by the user equipment, with a cluster group based on the cluster group identifier only upon determining that the network fails to operate.

An apparatus, according to certain embodiments, can include at least one processor and at least one memory including computer program code. The at least one memory and the computer program code can be configured to, with the at least one processor, cause the apparatus at least to form, by an element of a network, a cluster group for a plurality of user equipment in a location. The at least one memory and the computer program code can also be configured to, with the at least one processor, cause the apparatus at least to communicate, by the element, information comprising a cluster group identifier to a user equipment of the plurality of the user equipment. The cluster group can be configured to operate only when the network fails to operate.

An apparatus, in certain embodiments, can include at least one processor and at least one memory including computer program code. The at least one memory and the computer program code can be configured to, with the at least one processor, cause the apparatus at least to store, at a user equipment, information comprising a cluster group identifier received from an element of a network, wherein the cluster group identifier is configured to group a plurality of user equipment including the user equipment. The at least one memory and the computer program code can also be configured to, with the at least one processor, cause the apparatus at least to determine, at the user equipment, that the network fails to operate. The at least one memory and the computer program code can further be configured to, with the at least one processor, cause the apparatus at least to communicate, by the user equipment, with a cluster group based on the cluster group identifier only upon determining that the network fails to operate.

According to certain embodiments, an apparatus can include means for forming, by an element of a network, a cluster group for a plurality of user equipment in a location. The apparatus can also include means for communicating, by the element, information comprising a cluster group identifier to a user equipment of the plurality of the user equipment. The cluster group can be configured to operate only when the network fails to operate.

In certain embodiments, an apparatus can include means for storing, at a user equipment, information comprising a cluster group identifier received from an element of a network, wherein the cluster group identifier is configured to group a plurality of user equipment including the user equipment. The apparatus can also include means for determining, at the user equipment, that the network fails to operate. The apparatus can further include means for communicating, by the user equipment, with a cluster group based on the cluster group identifier only upon determining that the network fails to operate.

A non-transitory computer-readable medium can, according to certain embodiments, be encoded with instructions that, when executed in hardware, perform a process. The process can include forming, by an element of a network, a cluster group for a plurality of user equipment in a location. The process can also include communicating, by the element, information comprising a cluster group identifier to a user equipment of the plurality of the user equipment. The cluster group can be configured to operate only when the network fails to operate.

A non-transitory computer-readable medium can, in certain embodiments, be encoded with instructions that, when executed in hardware, perform a process. The process can include storing, at a user equipment, information comprising a cluster group identifier received from an element of a network, wherein the cluster group identifier is configured to group a plurality of user equipment including the user equipment. The process can also include determining, at the user equipment, that the network fails to operate. The process can further include communicating, by the user equipment, with a cluster group based on the cluster group identifier only upon determining that the network fails to operate.

According to certain embodiments, a computer program product can include instructions to perform a process. The process can include forming, by an element of a network, a cluster group for a plurality of user equipment in a location. The process can also include communicating, by the element, information comprising a cluster group identifier to a user equipment of the plurality of the user equipment. The cluster group can be configured to operate only when the network fails to operate.

In certain embodiments, a computer program product can include instructions to perform a process. The process can include storing, at a user equipment, information comprising a cluster group identifier received from an element of a network, wherein the cluster group identifier is configured to group a plurality of user equipment including the user equipment. The process can also include determining, at the user equipment, that the network fails to operate. The process can further include communicating, by the user equipment, with a cluster group based on the cluster group identifier only upon determining that the network fails to operate.

BRIEF DESCRIPTION OF THE DRAWINGS

For proper understanding of the invention, reference should be made to the accompanying drawings, wherein.

DETAILED DESCRIPTION

Certain embodiments provide for network assisted group formation or clusters that can be effectively used by UEs for V2V in the event of total network collapse. Using this information, V2V can be done effectively. Accordingly, certain embodiments can address, among other things, the possible criteria for forming groups so that they can communicate with less interference, avoid extensive discovery processes, and the like. Moreover, certain embodiments can address the number of groups, number of victims in groups, and the selection of UEs to provide relay communication between groups.

More particularly, certain embodiments provide a network assisted UE cluster management technique in a given physical coverage area. The cluster management can include formation, partitioning, and reassignment.

A combination of machine learning algorithms, including classification, association and clustering techniques, can be used to learn the communicating entities, their location, and their services used to form cluster. Other ways of forming the clusters are also permitted.

Identification of clusters that are formed can be communicated to UEs. Thus, there may be no need for a UE discovery process when the network ceases to be available.

Certain embodiments may relate to three distinguishable aspects: cluster management, message exchange, and a disaster scenario. In connection with cluster management, information used to form clusters and other collected information can be used for classification. Cluster formation and resizing of the cluster to dynamic changes can be performed as part of cluster management. Moreover, information regarding the clusters can be communicated to each UE.

Message exchange can describe how and when information flow is exchanged between network elements. Message exchange can also relate to the steps and conditions used to detect cluster changes based on UE and network impact are communicated. By contrast, disaster scenario can relate to how the cluster information that was supplied to UE, when it was in contact with the network, is used during disaster situation for V2V communication.

As mentioned above, cluster management can relate to how to form a cluster between UEs that are in a given physical region. In a given physical region there may be many operators covering with the help of one or more cell towers. Moreover, each UE may belong to a home public land mobile network (PLMN) or may be roaming. Additionally, there may be other distinguishing characteristics with respect to each of the UEs.

From a cluster formation viewpoint, the system can group the collocated UEs in a given physical region and communicate to them their group number and beacon frequency for use if the network stops working. Other radio frequency (RF) related information can also be provided to the UEs.

Clusters of nodes can make for efficient communication. In certain embodiments, only certain nodes that are at a boundary of clusters are designated as a relay node that can receive, and communicate between groups.

Certain embodiments may predict that victims' movements are restricted to being less than about two or three kilometers. Thus, the clusters may be formed utilizing this prediction.

More specifically, in certain embodiments the system learns all the types of communication before disaster and determines the cluster size, number of clusters, number of nodes per cluster, traffic density, location density, and so on. To do this, the system can keep computing as shown in FIG. 2.

Figure 2:
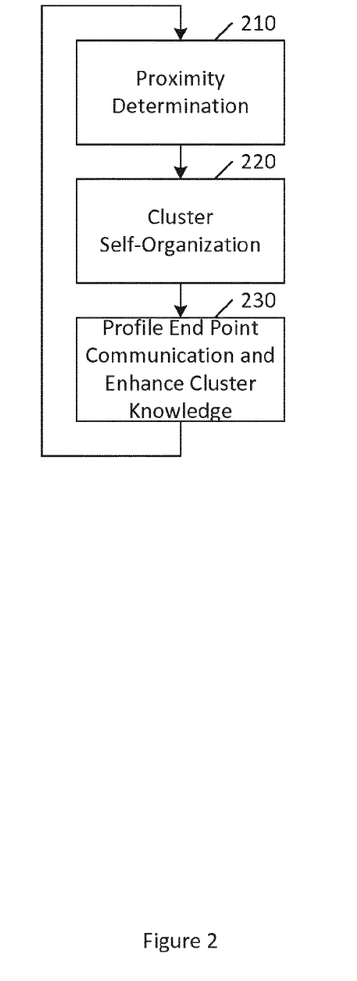
FIG. 2 illustrates a cluster management method according to certain embodiments.

FIG. 2 illustrates a cluster management method according to certain embodiments. As shown in FIG. 2, a method may include proximity determination at 210. The method may also include, at 220, cluster self-organization, which includes such features as, for example, formation, re-orientation, partitioning, and resizing. The method may further include, at 230, profiling end point communication and enhancing cluster knowledge and partitioning. These features may be performed repetitively, as the network environment change due to many factors, such as changes in position of cluster members.

The proximity determination at 210 can be variously performed. For example, in certain embodiments first a location can be determined corresponding to each UE. Moreover, it can be determined how closely they are related to other UE's in the given area. Next, the system can get to know the number of cell towers that each UE receives, such as by examining the PLMN reported by each UE, and their service cells. Third, the system can determine how closely each UE is located to each other UE, irrespective whether they share common profile, are roaming, belong to a different operator, or the like.

The cluster self-organization, at 220, may include formation, re-orientation, partitioning, and resizing, as mentioned above. First, in one example referring to FIG. 1, a cluster may be formed from UE1-5 yielding group C1. The members of this cluster may be in close proximity. The members of this cluster may be able to perform D2D even if they do not have any common profile to share. There are several ways this or any cluster can be formed. For example, user location based clustering may be one of the basic requirements for V2V. Thus, in certain embodiments cluster formation can be based on density based clustering techniques.

Next, the system can assign and generate a cluster ID and an appropriate beacon frequency that will be used by the cluster for V2V communication. Alternatively or in addition, the system can provide proper SSID or Wi-Fi information.

At a later time one of the UEs, for example UE5, can move away from its cluster group, in this case C1. The system can reassess the cluster and assign the wandering UE, in this case UE5, to a different cluster if possible. Alternatively, the wandering UE may be assigned to its own, isolated cluster. A goal of cluster algorithm may be to associate each UE to find its best possible neighbors based on one or more preferences. An isolated cluster with one UE node will be formed only when all preferences fail, and one or more UEs are scattered, such that there is no way they could establish communication after disaster. To handle such exceptional situations, cluster algorithms can supply additional vector information to each of the UEs. This vector can contain epicenter (or central location coordinates) that were computed by the cluster algorithms. The operator can bundle such applications as part of each phone to support disaster service applications. These applications can include search-and-rescue and lost-and-found applications and these applications may only be active during the disaster time. Such applications may be able to read the cluster vector and give local direction to user of that UE towards one of the cluster areas. This information may help isolated UEs to be part of some clusters.

For example, there may be four clusters: C1, C2, C3 and C4. The center of the cluster can be determined by drawing contour around all UEs that are part of that cluster. Then an approximate center location can be determined for each cluster: for C1 the centered location is X1 and Y1 coordinates; for C2 it is X2, Y2; for C3 it is X3, Y3; and for C4 it is X4, Y4. Such clustered vectors can be passed to UEs so that each UE could use that information and try to use disaster application that will navigate towards one of the nearest clusters. This information can be supplied to all UEs, but UEs that are isolated can use this information for local navigation when the UEs are unable to make any communication with other UEs.

Interference reported by UEs during D2D or with UE-to-BTS communication can be provided to the system. This information can be used to determine the size of cluster and the UE traffic density inside the cluster. If resizing or re-orientation is performed, for example across PLMNs and UE group, then the interference information can be used to properly size and/or orient the devices.

At 230, profiling end point communication and enhancing cluster knowledge and partitioning can be performed, as mentioned above. In this process, the system can first learn the communicating endpoints. This learning can involve various aspects. For example, the learning can involve learning how each of the UEs are engaged with other UEs in D2D communication or Wi-Fi direct communication. The learning can also involve receiving statistics from each of the UEs when they communicate using, for example, Wi-Fi direct. The learning can also include storing, for each UE, how, when, with whom, and where the UE is engaged in D2D communication. The learning can also involve learning if UEs are engaged in D2D communication with the help of two cell towers belonging to different operators. In such a case, exchange of the cluster information can be performed with respect to an inter-operator agreement.

The process of profiling end point communication and enhancing cluster knowledge and partitioning can also include handling inter-operator exchange of data. For example, if UE1 belongs to operator A and UE2 belongs to operator B, and these UEs happen to be in an overlapped coverage region, and in close proximity to each other, then cluster information can be shared as vectors via an inter-operator exchange mechanism.

The process can also include partitioning. For example, if a greater number of nodes than a predetermined threshold are present in the cluster, then the cluster can be partitioned for effective communication even if the UEs are in close proximity. Partitioning can have various aspects.

For example, partitioning can involve partitioning to preserve D2D groups if available. For example, if UE1 is communicating with UE2, but not with UE5 or UE6, then a cluster can be partitioned with the cluster size of 2. Thus, UE1 and UE2 can be in Cluster-1 and UE5 and UE6 can be in cluster-2.

In another aspect, partitioning can be configured to preserve static subscriber profiles. For example, if UE1, UE2, and UE3 are part of a single family, living in a same residence, or the like, they can be maintained in a same cluster, regardless of other factors. It is possible that devices can be assigned to more than one cluster. For example, a device may be configured to a first cluster based solely on proximity and the device may also be configured to a second cluster based on the static subscription profile.

In a further aspect, the partition can be configured to preserve other supplementary profiles, if made available to the operators or system. Such supplementary profiles may include things like "friends" lists, contact lists of the user, or frequently called numbers associated with the user.

The process of profiling end point communication and enhancing cluster knowledge and partitioning can also include adaptive learning of D2D behavior. For example, when two or more nodes are directly exchanging data, the system can ask for statistics via control information about the nodes' interference, frequency used, Wi-Fi direct or LTE usage, available bandwidth, velocity of movement during the session, and the like.

The system can then use the learned behavior as cluster node characteristics. Thus, cluster group formation can be based on the learned behavior of the nodes.

Figure 3:
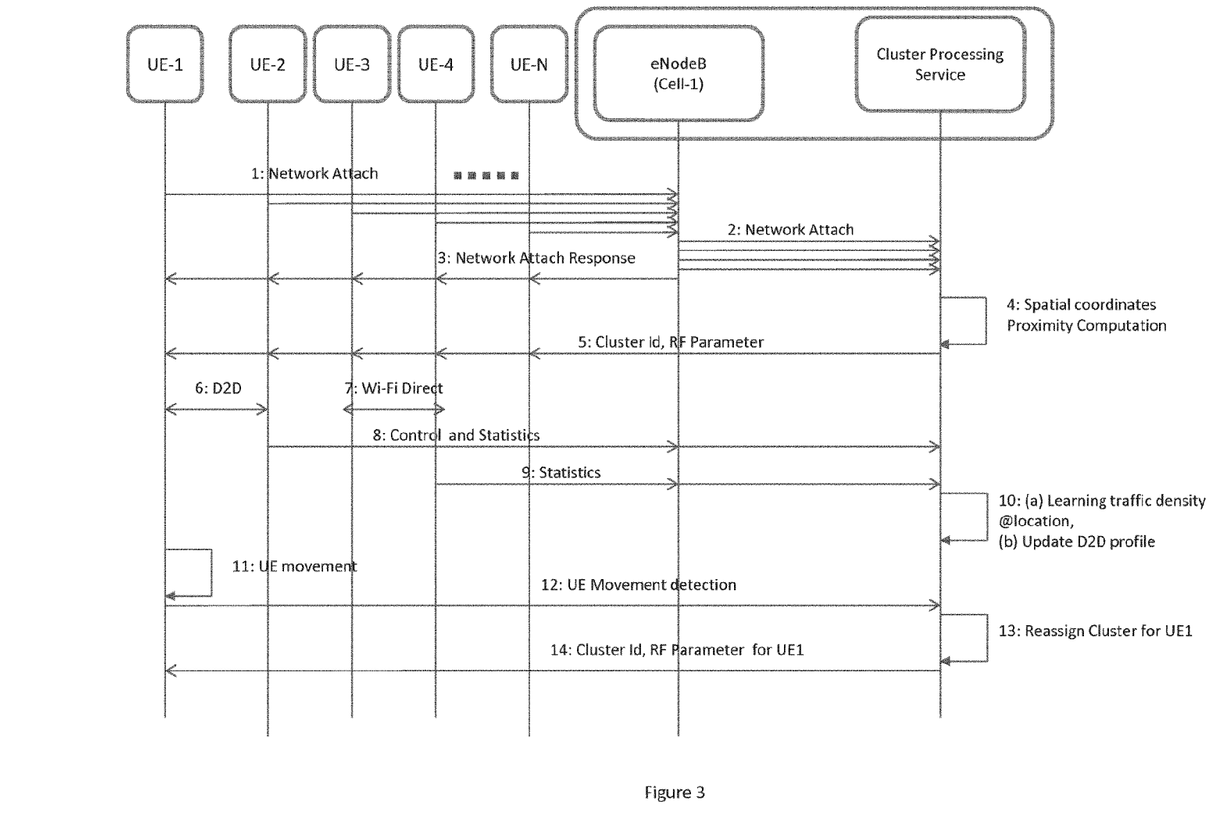
FIG. 3 illustrates an exchange of cluster messages according to certain embodiments.

As mentioned above, exchange of messages can be one aspect of certain embodiments. FIG. 3 illustrates an exchange of cluster messages according to certain embodiments. More particularly, FIG. 3 shows cluster message exchange that may occur during normal operation, namely prior to a disaster occurring.

FIG. 3 describes the sequence of operations that are performed in wireless access networks. The previous discussion described how a cluster is created, partitioned, resized, combined when needed, and also re-organized when a UE moves away from a group of cluster nodes. FIG. 3 gives a portion of messaging for the purposes of illustration. As shown in FIG. 3, there can be UE-1 to UE-4 and there can be many UEs, namely N UEs. Although not visible in FIG. 3, these UEs can be scattered in a given physical area. FIG. 3 illustrates a clustering processing with respect to one cell. The same approach can be applied across cells in a coordinated fashion within a single operator and also amongst various operators. In certain embodiments, the cluster processing can be performed by a disaster management function, which can reside either in a local cell, within an operator network, or apart from but connected to the operator networks. In certain embodiments, this disaster management function can be embodied by a cluster processing server (CPS).

In FIG. 3, at 1, UE-1, UE2, UE3, UE4 and so on up to UE-N can generate a respective location update request via network attach. Then, at 2, each network attach message can be forwarded to a CPS and the CPS can start to determine the spatial location of each UE. Meanwhile, at 3, a network attach response can be generated to each UE from the wireless access network with the help of other network elements, such as a mobility management entity (MME), home subscriber server (HSS) and the like, which are not shown in the figure.

At 4, the CPS, upon receiving each network attach request message, can determine spatial coordinates of the corresponding UE. There are various mechanisms that can be used to determine the spatial coordinates of UE, such as considering a cell identifier of the cell for the UE, or global positioning system (GPS) data provided by the UE. CPS can use one or more combination of those or other mechanisms, and can start classification of the respective UE based on location proximity. For example, spatial coordinates can be either generated explicitly by UE or reported after the network attachment. Alternatively, the network can determine the spatial coordinates of each UE by using network assisted mechanisms.

As more UEs get attached to network, the number of clusters and the number of nodes per cluster can be determined based on the mean distance between UEs. If previous UEs at a location reported any interference or throughput measurement or other similar measurements, this or other historical data can also be used to determine the size of cluster. It should be noted that the steps described above are shown as if all the UEs are attaching in parallel. However, in practice the UEs may attach in sequence.

When more UEs are reporting other cell towers, the CPS can query other operators, such as by querying the other operators' respective CPSs. The CPS can then exchange learnt UEs' information to form unified clusters. This could result in vectors of cluster information.

At 5, the CPS server can generate information for communication when no cell tower is available. This information can include beacon frequencies that each UE is to use to have coordinated communication along with timeslot and other communication information. The information can also include cluster ID. If UE are fast moving targets, then based on the velocity, coverage, trajectory information, and the like, a vector of cluster information can be provided to that UE. When such vectors are available, the UE could use any one of those clusters based on the neighboring UEs cluster IDs that the UE hears after the disaster event begins. The vector of cluster information may also take into account different groups with which the UE is associated—for example a group of fellow employees, family members, or neighbors can each be associated with a cluster ID and each of these cluster IDs can be included in the vector.

At 6, there are a few possible scenarios that can be occurring, related to D2D. For example, UE1 and UE2 may be in proximity and may be D2D communicating with or without network assistance.

Similarly, at 7, there are a few possible scenarios that can be occurring, related to Wi-Fi direct. For example, UE1 and UE2 can be in proximity and may be Wi-Fi direct communicating with or without network assistance.

At 8, in the case of D2D, network control and statistics related to throughput, interference, and the like are sent during and/or after completing a D2D session.

Similarly, at 9, in the case of Wi-Fi Direct, after completing the communication, a vector of information by combining throughput, localized mobility, and time can be communicated to the CPS server. This step, like many others, is optional.

At 10, after receiving information from various UEs from message 8 and message 9, the CPS can recompute the values described at 4, above. If there is requirement to resize the cluster, then the CPS may generate message 5 to the impacted UE(s).

At 11, although UE-1 may already be part of some cluster, UE-1 may be moving away from the cluster. Thus, when UE-1 has drifted enough, a maximum distance required to have D2D may not be possible. The D2D ad hoc mode maximum distance can be computed with a combination of inputs such as average distance between a given UE and other close UEs, required bandwidth, interference, and the like.

At 12, UE1 movement can be reported by the UE to the network. Alternatively, the network can perform movement detection using a variety of location detection techniques. At 13, when the UE1 has moved away from a previously assigned cluster, for example CL-1, then a new cluster for UE-1 can be determined based on the current location. At 14, the newly formed cluster information and associated parameter can be communicated to UE1.

Figure 4A:
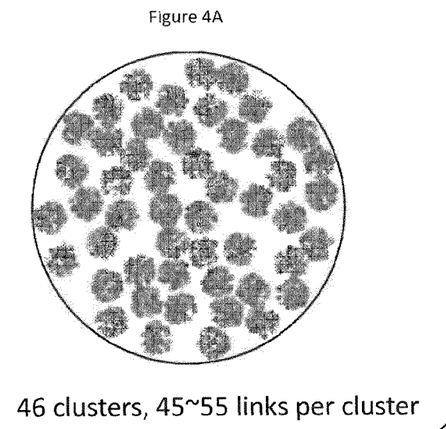
FIGS. 4A-C illustrates classification, association, and clustering of user equipment communication based on behavior and location density.
Figure 4B:
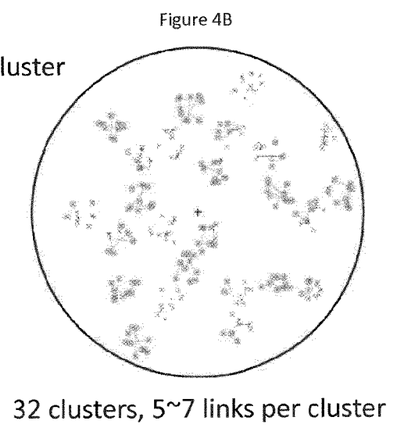
Figure 4C:
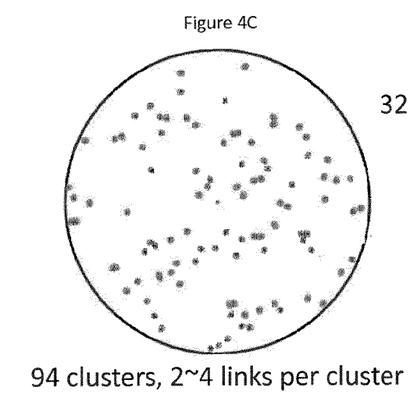

FIGS. 4A-C illustrate classification, association, and clustering of user equipment communication based on behavior and location density. FIGS. 4A-C more particularly describe the resultant cluster information of each UE, where the data was taken from a real network and classification, association and clustering were performed. The resultant cluster information and RF frequency can be used between UEs for D2D ad hoc communications.

More particularly, FIG. 4A illustrates 46 clusters with 45-55 links per cluster. FIG. 4B illustrates 32 clusters with 5-7 links per cluster. Similarly, FIG. 4C illustrates 94 clusters with 2-4 links per cluster.

Operation during disaster can be performed by the UEs. For example, this operation can occur when no network is detected by the UEs. Various techniques can be used to determine that there is no available cell tower. Each UE can know the cluster and can also know the beacon frequency with which the UE can communicate to other UEs. The discovery of other UEs in an area can be avoided. Network assisted group formation and frequency assignment, discussed above, can be used to avoid collision and limit or avoid the discovery process.

Certain embodiments may have various benefits or advantages. For example, certain embodiments may provide a network assisted cluster formation technique that can involve learning from various data sources, including directly from the UEs' communicating pattern and UEs' locations.

Moreover, certain embodiments may provide a machine learning approach, which is used to learn the communicating entities, their location, and their services used to form cluster. Furthermore, in certain embodiments, clusters that were formed are communicated to UEs so as to avoid any discovery when network becomes unavailable.

Additionally, cluster management can, in certain embodiments, involve cluster formation, deformation, partitioning, resizing, and the like. These actions can be done in real-time. Thus, communication can be limited to only the impacted UEs.

Also, various embodiments can be flexibly applied to different communication systems. For example, certain embodiments can be used for both Wi-Fi and cellular networks, including both 3G and LTE cellular networks. Similarly, certain embodiments can work for both licensed and unlicensed spectrum. Furthermore, while it is not necessary to standardize all embodiments, certain embodiments can be standardized in connection with 3GPP standards, to provide a D2D ad hoc mode.

Certain embodiments may have various characteristics. For example, in certain embodiments cluster information is exchanged between CPS and UE. Also, in certain embodiments, CPS can generate information that is going to be used by UEs for V2V. The information can be provided as beacon values and, in certain embodiments, contention in those beacon values can be avoided. Thus, certain embodiments can provide a collision-free distributed assignment. Additionally, in certain embodiments each UE during V2V can communicate the cluster ID information as part of the beacon, and those can easily be noticed and detected.

Figure 5:
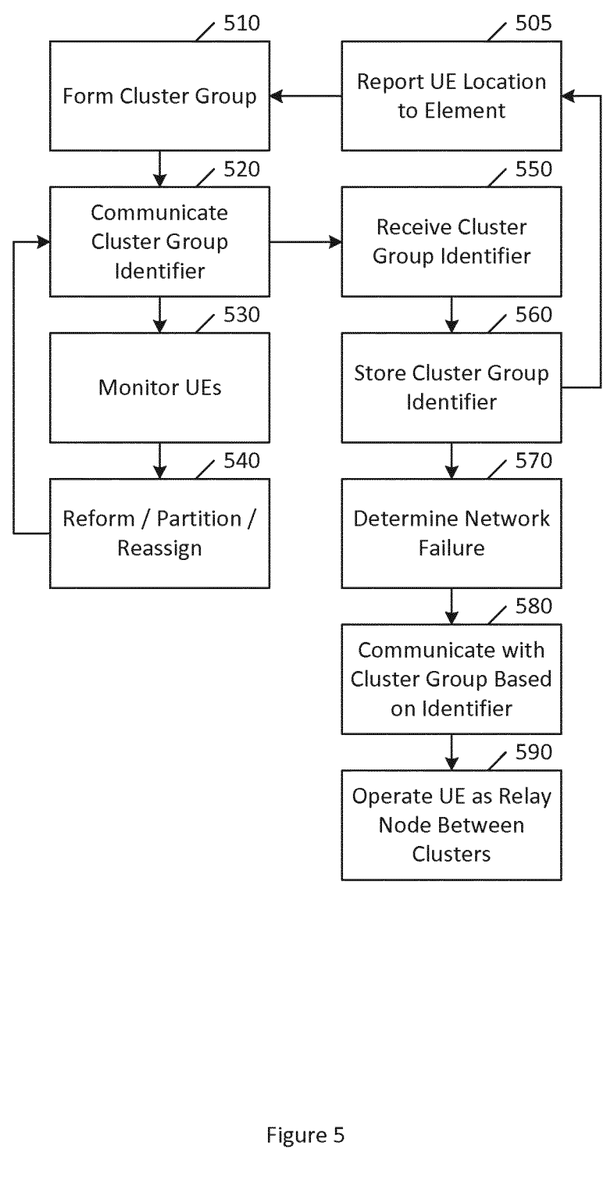
FIG. 5 illustrates a method according to certain embodiments.

FIG. 5 illustrates a method according to certain embodiments. As shown in FIG. 5, a method may include, at 510, forming, by an element of a network, a cluster group for a plurality of user equipment in a location. The element may be, for example, a CPS or a disaster management function.

The forming can be based on a location of each user equipment of the plurality of user equipment.

The method may also include, at 520, communicating, by the element, information comprising a cluster group identifier to a user equipment of the plurality of the user equipment.

The cluster group can be configured to operate only when the network fails to operate. For example, the cluster group can be exclusively for use in connection with V2V communication in the case of a disaster. The information can be configured to permit the user equipment to operate in the cluster group contention-free, without network assistance during operation.

The information sent from the element can include an identifier of whether the user equipment is configured to relay between clusters. This identifier may be a flag and may be accompanied by additional information, such as the cluster group identifier of a second cluster group to which the user equipment should relay information. The information can also or alternatively include a vector comprising a plurality of cluster group identifiers.

The method can additionally include, at 530, monitoring the plurality of user equipment. The method can additionally include, at 540, at least one of reforming, partitioning, or reassigning the cluster group based on the monitoring. The monitoring can include monitoring at least one of a location, a static subscription profile, and a user preference. Other statistics, radio frequency information, and control information can also be monitored.

The method can also include, at 550, receiving, at the user equipment, the cluster group identifier. This can be received repeatedly, both after an initial cluster formation at 510 and after cluster reformation/partition/reassignment at 540. The method can further include, at 560, storing, at the user equipment, information comprising a cluster group identifier received from an element of a network. The cluster group identifier can be configured to group a plurality of user equipment including the user equipment. Moreover, the method can include, at 505, reporting, by the user equipment, a location of the user equipment to the element. This reporting can occur repeatedly, both before receiving a cluster group identifier at 550 and after storing the cluster group identifier at 560.

The method can further include, at 570, determining, at the user equipment, that the network fails to operate. In other words, the user equipment can detect that a network failure has occurred. This detection can happen in a variety of ways, including a network sending out a message indicating that the network is going off-line due to a disaster or other emergency.

The method can additionally include, at 580, communicating, by the user equipment, with a cluster group based on the cluster group identifier only upon determining that the network fails to operate. In other words, the cluster group can remain unused while the network is operating. The use of the cluster group can be further conditional upon user input. For example, the user equipment can prompt the user to indicate whether a V2V communication mode should be used.

The method can also include, at 590, operating the user equipment as a relay between clusters when the information further comprises an identifier that the user equipment is to relay between clusters.

As mentioned above, the information can be a vector that includes a plurality of cluster group identifiers. Moreover, the information can be configured to permit the user equipment to operate in the cluster group contention-free, without network assistance during operation. Thus, in certain embodiments, the information can provide an identification of all the V2V groups that the device may wish to join in the event of a disaster.

Figure 6:
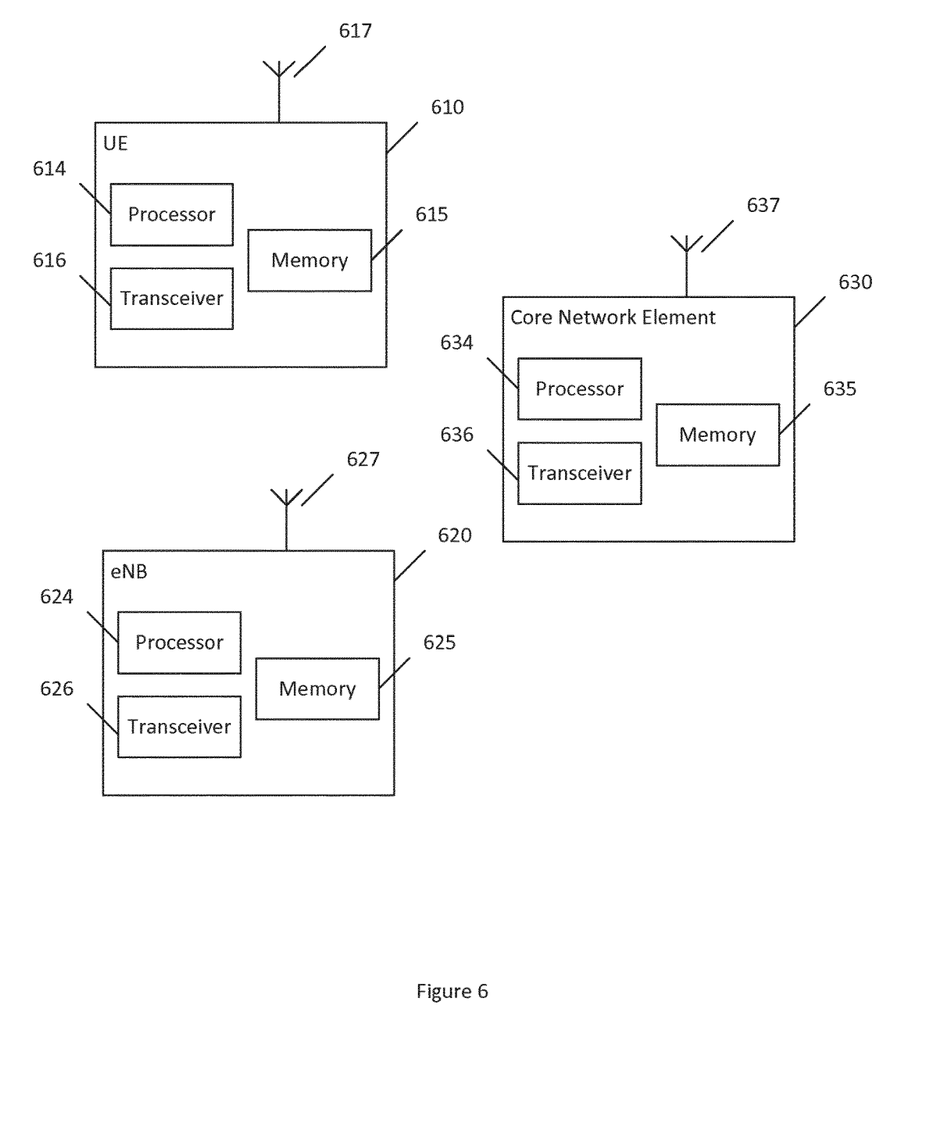
FIG. 6 illustrates a system according to certain embodiments.

FIG. 6 illustrates a system according to certain embodiments of the invention. In one embodiment, a system may include multiple devices, such as, for example, at least one UE 610, at least one eNB 620 or other base station or access point, and at least one core network element 630. In certain systems, only UE 610 and eNB 620 may be present, and in other systems UE 610, eNB 620, and a plurality of other user equipment may be present. Other configurations are also possible.

Each of these devices may include at least one processor, respectively indicated as 614, 624, and 634. At least one memory can be provided in each device, as indicated at 615, 625, and 635, respectively. The memory may include computer program instructions or computer code contained therein. The processors 614, 624, and 634 and memories 615, 625, and 635, or a subset thereof, can be configured to provide means corresponding to the various blocks of FIG. 5. Although not shown, the devices may also include positioning hardware, such as global positioning system (GPS) or micro electrical mechanical system (MEMS) hardware, which can be used to determine a location of the device. Other sensors are also permitted and can be included to determine location, elevation, orientation, and so forth, such as barometers, compasses, and the like.

As shown in FIG. 6, transceivers 616, 626, and 636 can be provided, and each device may also include at least one antenna, respectively illustrated as 617, 627, and 637. The device may have many antennas, such as an array of antennas configured for multiple input multiple output (MIMO) communications, or multiple antennas for multiple radio access technologies. Other configurations of these devices, for example, may be provided. For example, core network element 630 may be configured for wired communication, rather than wireless communication, and in such a case antenna 637 would illustrate any form of communication hardware, without requiring a conventional antenna. The core network element 630 may be, for example, a disaster management function or CPS.

Transceivers 616, 626, and 636 can each, independently, be a transmitter, a receiver, or both a transmitter and a receiver, or a unit or device that is configured both for transmission and reception.

Processors 614, 624, and 634 can be embodied by any computational or data processing device, such as a central processing unit (CPU), application specific integrated circuit (ASIC), or comparable device. The processors can be implemented as a single controller, or a plurality of controllers or processors.

Memories 615, 625, and 635 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 610, eNB 620, and core network element 630, to perform any of the processes described above (see, for example, FIGS. 2, 3, and 5). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 6 illustrates a system including a UE, eNB, and core network element, embodiments of the invention may be applicable to other configurations, and configurations involving additional elements. For example, not shown, the UE 610 may be in communication with a wireless local area network.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
   forming, by an element of a network, a self-organizing cluster group for a plurality of user equipment devices in a location; and
   communicating, by the element, information comprising a self-organizing cluster group identifier and a beacon frequency to a user equipment device of the plurality of user equipment devices for establishing direct communication between the plurality of user equipment devices, wherein
   the self-organizing cluster group is configured to operate only during a total failure of the network.

2. The method of claim 1, wherein the information further comprises an identifier of whether the user equipment device is configured to relay between clusters.

3. The method of claim 1, further comprising:
   monitoring the plurality of user equipment devices; and
   at least one of reforming, partitioning, or reassigning the cluster group based on the monitoring.

4. The method of claim 3, wherein the monitoring comprises monitoring at least one of a location, a static subscription profile, and a user preference.

5. The method of claim 1, wherein the forming is based on a location of each user equipment device of the plurality of user equipment devices.

6. The method of claim 1, wherein the information comprises a vector comprising a plurality of cluster group identifiers.

7. The method of claim 1, wherein the information is configured to permit the user equipment device to operate in the cluster group contention-free, without network assistance during operation.

8. A method, comprising:
   storing, at a user equipment device, information comprising a self-organizing cluster group identifier and a beacon frequency received from an element of a network, wherein the self-organizing cluster group identifier is configured to group a plurality of user equipment devices including the user equipment device for establishing direct communication between the plurality of user equipment devices;
   determining, at the user equipment device, that a total failure of network operation has occurred; and
   communicating, by the user equipment device, with a self-organizing cluster group based on the self-organizing cluster group identifier and the beacon frequency upon determining that a total failure of network operation has occurred,
   wherein the user equipment device communicates with the self-organizing cluster group only during a total failure of the network.

9. The method of claim 8, further comprising:
   operating the user equipment device as a relay between clusters when the information further comprises an identifier that the user equipment device is to relay between clusters.

10. The method of claim 8, further comprising:
    reporting, by the user equipment device, a location of the user equipment device to the element.

11. The method of claim 8, wherein the information comprises a vector comprising a plurality of cluster group identifiers.

12. The method of claim 8, wherein the information is configured to permit the user equipment device to operate in the cluster group contention-free, without network assistance during operation.

13. An apparatus, comprising:
    at least one processor; and
    at least one memory including computer program code,
    wherein the at least one memory and the computer program code are configured to, with the at least one processor, cause the apparatus at least to:
    form, by an element of a network, a self-organizing cluster group for a plurality of user equipment devices in a location; and
    communicate, by the element, information comprising a self-organizing cluster group identifier and a beacon frequency to a user equipment device of the plurality of user equipment devices for establishing direct communication between the plurality of user equipment devices, wherein
    the self-organizing cluster group is configured to operate only during a total failure of the network.

14. The apparatus of claim 13, wherein the information further comprises an identifier of whether the user equipment device is configured to relay between clusters.

15. The apparatus of claim 13, wherein the at least one memory and the computer program code are further configured to, with the at least one processor, cause the apparatus at least to:
    monitor the plurality of user equipment devices; and
    at least one of reform, partition, or reassign the cluster group based on the monitoring.

16. The apparatus of claim 15, wherein the at least one memory and the computer program code are configured to, with the at least one processor, cause the apparatus at least to monitor by monitoring at least one of a location, a static subscription profile, and a user preference.

17. The apparatus of claim 13, wherein the at least one memory and the computer program code are configured to, with the at least one processor, cause the apparatus at least to form the cluster group based on a location of each user equipment device of the plurality of user equipment devices.

18. The apparatus of claim 13, wherein the information comprises a vector comprising a plurality of cluster group identifiers.

19. The apparatus of claim 13, wherein the information is configured to permit the user equipment device to operate in the cluster group contention-free, without network assistance during operation.

20. A non-transitory computer-readable medium encoded with instructions that, when executed in hardware of a network element, perform a process, the process comprising the method according to claim 1.

* * * * *